United States Patent
Koch et al.

(10) Patent No.: US 6,823,838 B2
(45) Date of Patent: Nov. 30, 2004

(54) SWITCHING ASSEMBLY FOR CLOSING INTAKE LINES OF AN AIR INTAKE DEVICE AND INTAKE DEVICE INCORPORATING SAME

(75) Inventors: Ingo Koch, Ludwigsburg (DE); Herbert Pietrowski, Pleidelsheim (DE); Guenter Steiner, Auenwald (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 229 days.

(21) Appl. No.: 10/125,574

(22) Filed: Apr. 19, 2002

(65) Prior Publication Data

US 2002/0162531 A1 Nov. 7, 2002

(30) Foreign Application Priority Data

Apr. 20, 2001 (DE) .......................................... 101 19 281

(51) Int. Cl.[7] ................................................ F02D 9/08
(52) U.S. Cl. ......................... 123/336; 123/337; 251/305
(58) Field of Search ................................ 123/336, 337, 123/403, 442; 251/305, 306, 308

(56) References Cited

U.S. PATENT DOCUMENTS

| 5,304,336 | A | | 4/1994 | Karlsson et al. ............. 264/242 |
|---|---|---|---|---|
| 5,715,782 | A | | 2/1998 | Elder ..................... 123/184.61 |
| 6,321,718 | B1 | * | 11/2001 | Mangold et al. ............. 123/336 |
| 6,332,449 | B1 | * | 12/2001 | Girard ......................... 123/336 |
| 6,354,267 | B1 | * | 3/2002 | Kotchi et al. ................ 123/337 |
| 6,598,854 | B1 | * | 7/2003 | Jessberger et al. ........... 123/337 |
| 6,612,325 | B2 | * | 9/2003 | Rentschler et al. .......... 123/336 |

FOREIGN PATENT DOCUMENTS

| DE | 19735133 A1 | 3/1998 |
|---|---|---|
| DE | 19800207 | 9/1998 |
| EP | 482 272 B1 | 6/1995 |
| EP | 0725210 | 8/1996 |
| EP | 1085197 | 3/2001 |
| FR | 2743111 | 7/1997 |

OTHER PUBLICATIONS

Search Report.

* cited by examiner

Primary Examiner—Willis R. Wolfe, Jr.
(74) Attorney, Agent, or Firm—Crowell & Moring LLP

(57) ABSTRACT

A switching assembly (10) having closure elements such as switch valves (18), for example, for closing intake lines (24*b*) and an intake manifold (28) in which the switching assembly is installed. The switching assembly (10) advantageously is composed of assembly injection-molded valve modules including switch valves (18) and a frame (14*b*). Alternatively, the switch valves (18) may also be injection molded directly in place in the support component (17). Because it may be pre-assembled, the entire switching assembly (10) may be easily installed in the intake manifold. In addition, the switching assembly preferably has rotational axes (15) which lie at a right angle to the alignment of the valves. It is advantageous that each switch valve (18) has its own rotational axis, thereby avoiding additive tolerances. In this way a part is provided which is economical to produce and which satisfies the sealing requirements for the switching assembly.

5 Claims, 3 Drawing Sheets

SWITCHING ASSEMBLY FOR CLOSING INTAKE LINES OF AN AIR INTAKE DEVICE AND INTAKE DEVICE INCORPORATING SAME

BACKGROUND OF THE INVENTION

The invention relates to a switching assembly for closing intake lines of an intake device of an internal combustion engine. The invention also relates to an intake device in which such a switching assembly is installed.

Switching assemblies of the aforementioned type are known from the prior art. For example, according to Elder, U.S. Pat. No. 5,715,782 (=DE 197 35 133) a device for disconnecting the intake lines of an intake system is known which comprises switching assemblies, each of which joins two valves in a common valve frame. These individual switching assemblies are combined to form an adjusting unit which is driven by a common actuating means.

The switch valves according to the cited document all lie on a single axis. So-called assembly injection molding is used as the production method, in which the valves are injected directly into the frame, resulting in a functional unit which cannot be disassembled. This production method is described in more detail in Karlsson et al., U.S. Pat. No. 5,304,336 (=EP 482,272), for example. In the first step, the valve frame is extruded, with an air passage which is to be closed by the valve being introduced through a corresponding core. In the second step, this core is extended slightly to create a cavity into which the valve may be directly injected. The valve edge is thus formed not by a molding tool, but by the frame itself, thereby enabling tolerances to be completely compensated for. The shrinkage of the injected valve then enables free mobility of same in the valve frame. For this reason, the materials comprising the frame and the valve must not adhere to one another.

As a result of the shrinkage of the valve, however, the longitudinal displacement of a plurality of valves which are assembly injection-molded with a common shaft is additive. For this reason, in a design according to Elder, U.S. Pat. No. 5,715,782, it is necessary to divide the entire switching device into a plurality of switching assemblies comprising two valves each. More than two valves cannot be assembly injection-molded in a single piece, since the shrinkage of the valves would result in stress and increased friction of the valves in the various passage openings. This would seriously impair the function of such a switching assembly.

SUMMARY OF THE INVENTION

It is an object of the invention to provide a switching assembly which is economical to produce.

A further object of the invention is to provide a switching assembly which is easy to install.

Another object of the invention is to provide a switching assembly which optimally satisfies requirements for movability of the closure elements and sealing of the elements against the passages which are closed thereby.

These objects are achieved in accordance with the present invention by providing a switching assembly for closing air intake lines of an intake device of an internal combustion engine, comprising a frame in which a plurality of passages for the intake air corresponding to the intake lines are adjacently arranged, and a plurality of closure elements arranged in at least a portion of the passages, the closure elements being produced by molding in mold cavities defined at least partially by partial surfaces of the frame, and each closure element including a bearing shaft which is formed in one piece therewith and which defines an individual rotational axis for the respective closure element.

In accordance with a further aspect of the invention, the objects are achieved by providing a switching assembly for closing air intake lines of an intake device for an internal combustion engine, comprising a plurality of closure elements arranged in passages formed by frames for the closure elements, the closure elements being produced by molding in mold cavities defined at least partially by partial surfaces of the respective frames, and a support member for accommodating a plurality of the frames, each frame having a passage for the intake air, the frames being adjacently arranged in the support member, and the passages corresponding to the intake lines; in which each closure element includes a bearing shaft which is formed in one piece therewith and which defines an individual rotational axis for the respective closure element.

In yet another aspect of the invention, the objects are achieved by providing an intake device for intake air of an internal combustion engine, comprising a collector chamber having an inlet opening, a plurality of intake lines which branch off from the collector chamber and lead to a plurality of outlets to a cylinder head of the engine, a switching assembly installed in the intake device for closing at least a portion of the intake lines and an actuator for actuating the switching assembly; in which the switching assembly comprises a frame in which passages for the intake air corresponding to the intake lines are adjacently arranged, and a plurality of closure elements arranged in at least a portion of the passages, the closure elements being produced by molding in mold cavities defined at least partially by surfaces of the frame, and each closure element including a bearing shaft which is formed in one piece therewith and which defines an individual rotational axis for the respective closure element.

The switching assembly according to the invention has a frame in which, in a known manner, passages are provided which communicate with the intake lines of the intake device. The intake air flows through these passages. Closing the passages by means of corresponding closure elements thus results in closing of the intake lines.

The passages may be adjacently arranged in a variety of ways. An arrangement may be made in a row, although a staggered arrangement is also possible. This is particularly practical when only a portion of the passages are designed to be closed by closure elements.

The closure elements are produced by using partial surfaces of the frame as molding walls in addition to other molded parts, using the primary molding technique. In particular, assembly injection molding in which closure elements made of plastic may be produced is referred to here. The closure elements are injected into a cavity which is created by the molded parts and the partial surfaces of the frame with which the closure elements are to engage. Particular use is made here of the seating faces of the closure element, which must be in sealing contact with the frame parts which form the passages, at least when the closure element is closed. In addition, the bearing shafts of the closure elements, which are necessary for rotating same, are produced as one piece with the closure elements, thus forming support surfaces in the frame for the bearing shafts. However, the bearing shafts need not be supported directly in the frame. Additional slide rings or the like may also be used.

The switching assembly according to the invention is characterized by the fact that each of the bearing shafts produced as one piece with the closure elements has its own rotational axis. As a result, the individual bearing shafts may be controlled by a common actuating means to allow rotation of the bearing shafts. The essential advantage of the inventive design, however, is that all closure elements can be injected into a single frame, since on account of shrinkage the tolerances of the closure elements are not dictated by a common shaft. This results in a part that can be produced very economically while also meeting high tolerance requirements, thus assuring at the same time the function of the switching assembly according to the invention.

The switching assembly is thus formed from the frame and the associated closure elements injected into the frame. An alternative design of the switching assembly provides that the frames of the closure elements are individually produced as well, resulting in advantageous cost savings during production of the closure elements. These closure elements may be produced as standard components, thereby saving on production and machining costs. In order to apply the described standard components to different intake devices, a support component is also provided which accommodates the frame which is provided with closure elements. In this case as well, control of the individual closure elements is simplified by the fact that each of the bearing shafts has its own rotational axis.

In contrast to a common rotational axis according to the prior art, both of the described alternative designs also have the advantage that the addition of tolerances as the result of angular displacement of the valves on a common rotational axis is avoided entirely. The leakage specifications in particular are thus more easily met by the closure elements, since the latter may be adjusted individually for each valve. Addition of tolerances is precluded. Thus, even a deliberately provided angular displacement between the individual closure elements on the common rotational axis may be dispensed with, which results in a reliable closure of all valves by means of increasing torsion of the common adjusting shaft. Angular displacement creates extremely high adjusting forces which can be avoided by the design according to the invention.

An advantageous embodiment of the invention provides that switch valves are the closure elements. These switch valves are preferably constructed with a central bearing shaft as the rotational axis and with valve blades fastened to the bearing shaft in a butterfly fashion. The forces acting on the valve as a result of the air flow in the intake device are equalized on a switch valve of the type described, thus enabling the switch valve to be actuated by a small adjusting force.

A further advantageous embodiment of the invention provides that the closure elements comprise rotary valves. Such rotary valves may have a cylindrical design, for example, with the rotational axis of the closure element lying exactly in the axis of symmetry of the cylinder. A passage is provided through the cylinder at right angles to the axis, with the cross section of the passage corresponding essentially to the passage in the frame. Rotation of the rotary valve allows the passage to be opened and closed. The choice of a rotary valve has the advantage that when the rotary valve is open, no actuating shaft or switch valve which could cause disturbance of the air flow is present in the cross-sectional area of the intake line.

A further advantageous variant of the switching assembly provides that the bearing shafts each run at an angle of essentially 90° with respect to an imaginary axis parallel to the alignment of the passages. When the passages are arranged in a row in the frame, the angles of the bearing shafts are rotated by 90° in comparison to the common bearing shaft according to the prior art. However, an imaginary axis describing the basic alignment of the passages may also be specified when the closure elements have an offset arrangement. In this case as well, the bearing shafts may be aligned at an angle of 90°.

The described alignment has the advantage that the individual valves may be actuated in a particularly simple manner by a corresponding control device such as a control rod, for example. In addition, the distance between adjoining closure elements may be minimized, thereby allowing the switch valve to be housed in the narrowest possible space.

The invention likewise relates to an intake device in which the described switching assembly is installed.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawing figures in which.

DETAILED DESCRIPTION OF PREFERRED EMBODIMENTS

Figure 1:
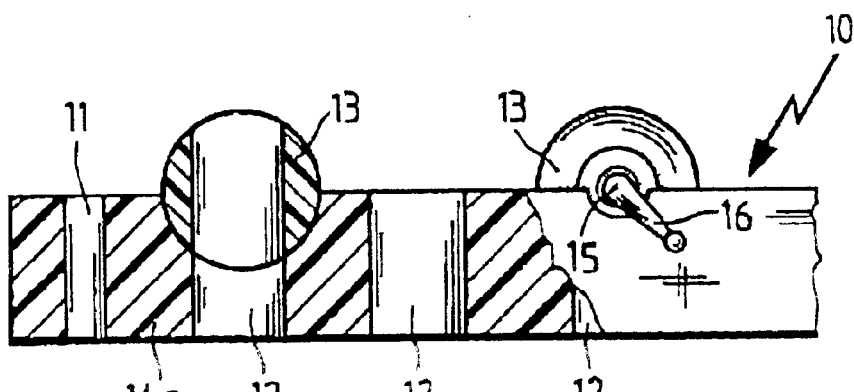
FIG. 1 shows a switching assembly with rotary valves injected into a single frame, in a partially cutaway side view.

FIG. 1 shows a switching assembly 10 which could be installed, for example, as an intermediate flange via mounting bores 11 between the cylinder head of an internal combustion engine (not shown) and the cylinder head flange of an intake manifold (also not shown). The switching assembly has passages 12 which communicate with the intake lines of the intake device, not shown. The passages are present in the connected and the disconnected states.

Rotary valves 13 are arranged in the connected passages. The rotary valves are injected into a frame 14a which together with the rotary valves forms switching assembly 10. In the cutaway portion it can be seen that the rotary valves are represented in the open position. A bearing shaft 15 is also shown which penetrates frame 14a and which is provided with a crank for mechanically controlling the associated rotary valve 13.

Corresponding parts in the following figures are identified by the same reference numbers, and therefore will not be described in further detail.

Figure 2:
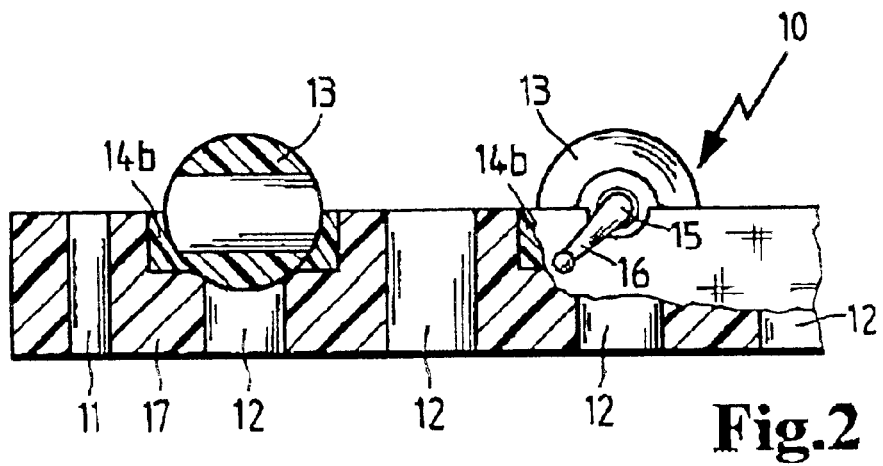
FIG. 2 shows a switching assembly corresponding to FIG. 1, with the rotary valves assembly injection-molded in single frames, in a partially cutaway side view.

FIG. 2 represents a variant of the switching assembly according to FIG. 1. This variant differs in that rotary valves 13 are each injected into separate frames 14b. This results in individual structural units which may be inserted into a support component 17. When installed in an intake manifold (not shown), the support component according to FIG. 2 thus serves the same purpose as frame 14a according to FIG. 1. The rotary valves in this case are shown in the closed position.

Figure 3:
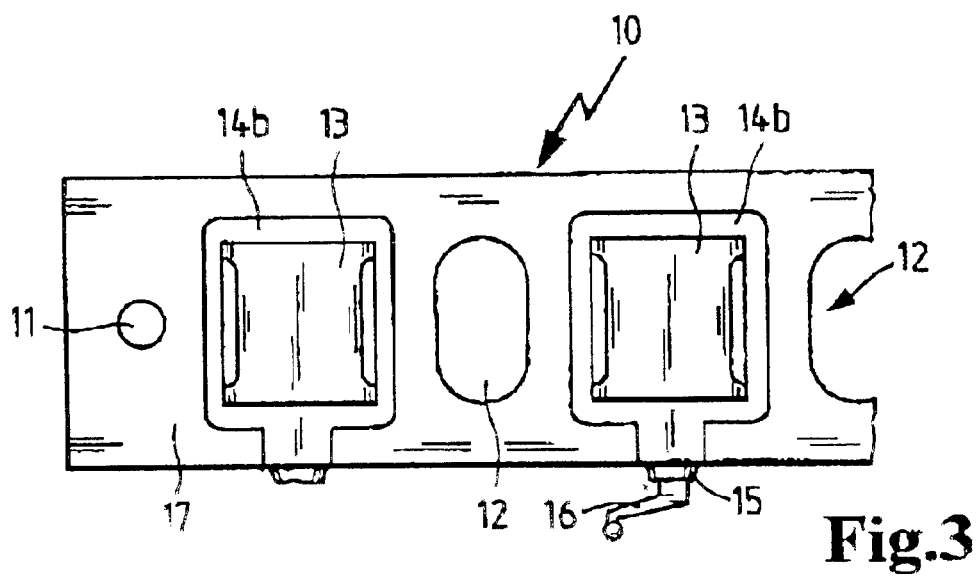
FIG. 3 shows a top view of the switching assembly according to FIG. 2.

FIG. 3 shows the contour of frames 14b in more detail. The frames annularly surround rotary valves 13, enabling frames 14b and rotary valves 13 to be sealed off from one another in the assembly in a targeted manner, as described for the advantages of assembly injection molding. Because the rotary valves are shown in the closed position, the passages situated underneath the rotary valves cannot be seen.

Figure 4:
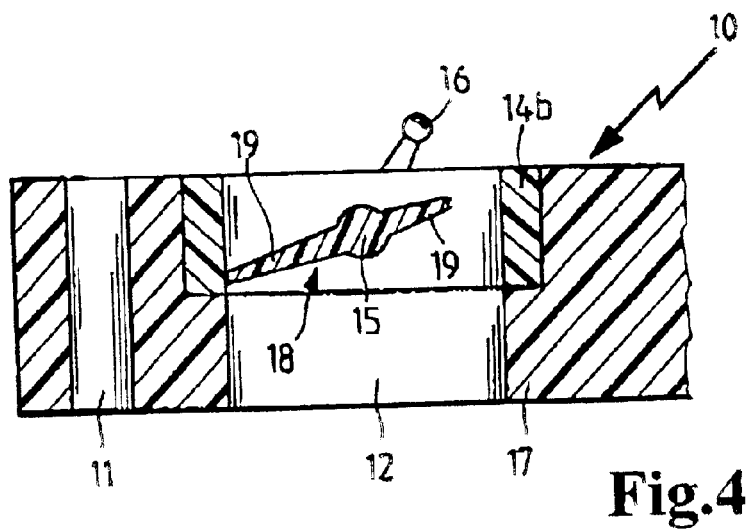
FIG. 4 shows a section through the portion of a switching assembly in which a switch valve module with single frames is inserted.

The switching assembly according to FIG. 4 corresponds to the design of the switching assembly shown in FIG. 2, except that a switch valve 18 is used instead of rotary valve 13 according to FIG. 2. Bearing shaft 15 of the switch valve and valve blades 19 projecting therefrom can be seen in the sectional view. Switch valve 18 is assembly injection-molded into frame 14b, as described in conjunction with FIG. 2. The frame is inserted into support component 17. A press fit, for example, may be employed to securely mount frame 14b in support component 17.

The design of the valve differs from that in FIG. 2. In FIG. 4, the valve is provided primarily to create turbulence in the intake air flow. Therefore, the valve in its closed position does not entirely close the cross section of the intake line.

Figure 5:
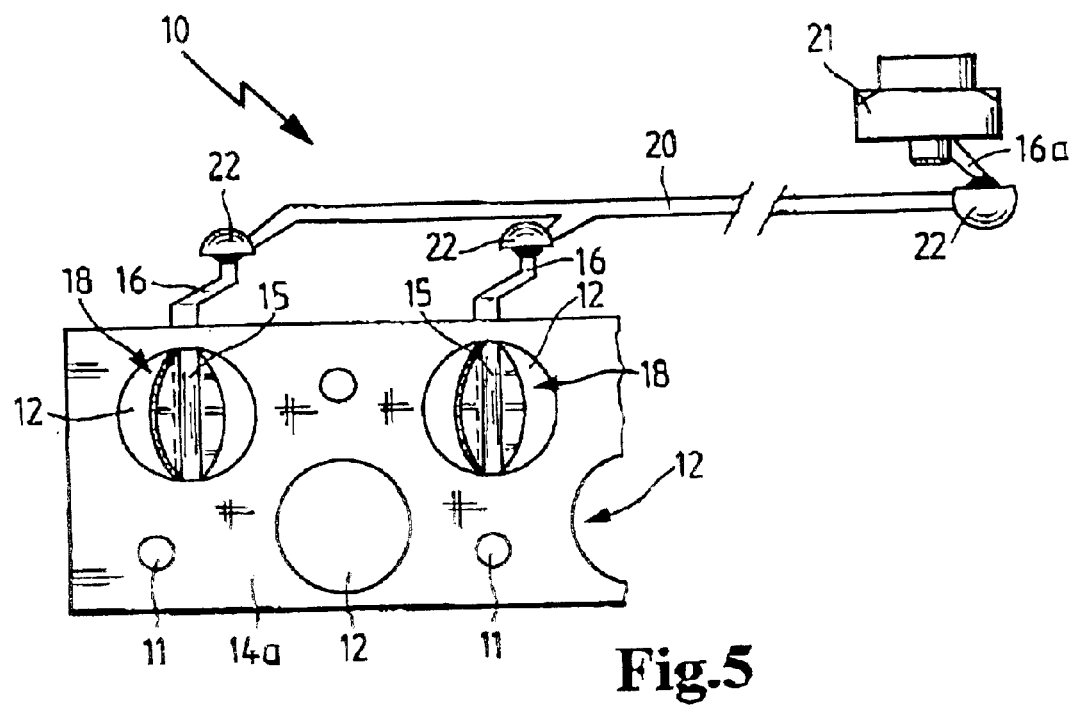
FIG. 5 shows a top view of a switching assembly having directly injected switch valves and actuating rods.

FIG. 5 shows a switching assembly with passages 12 in a staggered arrangement. A row of passages is provided with switch valves 18 which are directly injected into frame 14a. FIG. 5 also shows an actuating device comprising a push rod 20 and a drive 21. The push rod contacts cranks 16 of switch valves 18 via ball-and-socket joints 22, with the drive force being transmitted by handle 16a.

Figure 6:
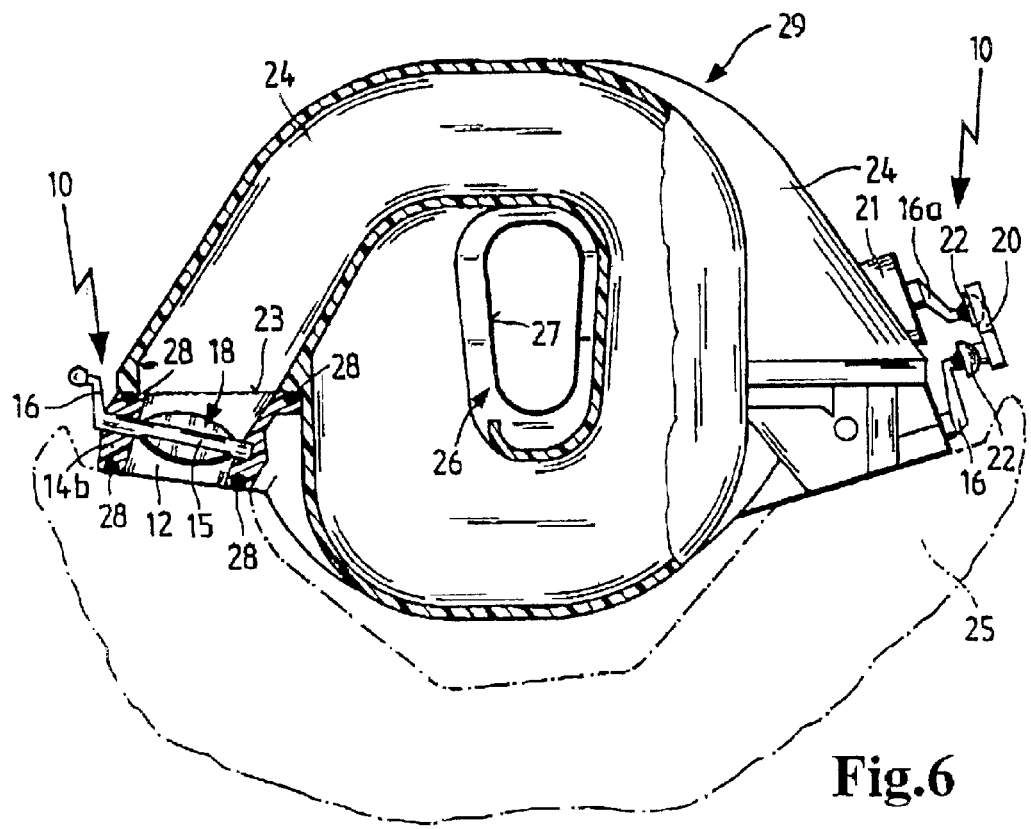
FIG. 6 shows the installation of a switching assembly, designed according to FIG. 5, in the intake lines of an intake manifold upstream of the cylinder head flange.

FIG. 6 shows the installation of a switching assembly in an intake manifold. The switching assembly is joined to outlets 23 on the cylinder head side which connect intake lines 24 to the schematically represented cylinder head 25 of an internal combustion engine. The intake manifold comprises a collector chamber 26 from which intake lines 24 branch off alternately and run circumferentially in the collector chamber in a spiral shape. The intake manifold is therefore suitable for an internal combustion engine having cylinders in a V-shaped configuration.

On the side of the intake manifold which is not cut away, the actuating device is shown which comprises the components according to FIG. 5, cranks 16, ball-and-socket joints 22, push rod 20, and drive 21. The drive may be achieved by an electric motor, for example. Another option is to attach a vacuum cell, which can be switched by the intake manifold vacuum, for example. Finally, an inlet 27 for combustion air is shown in the collector chamber. Cleaned intake air enters this inlet, through the air filter in the intake duct, to be distributed via collector chamber 26. The switching assembly is provided with seals 28 to assure a separating seal between intake manifold 29 and cylinder head 25.

Figure 7:
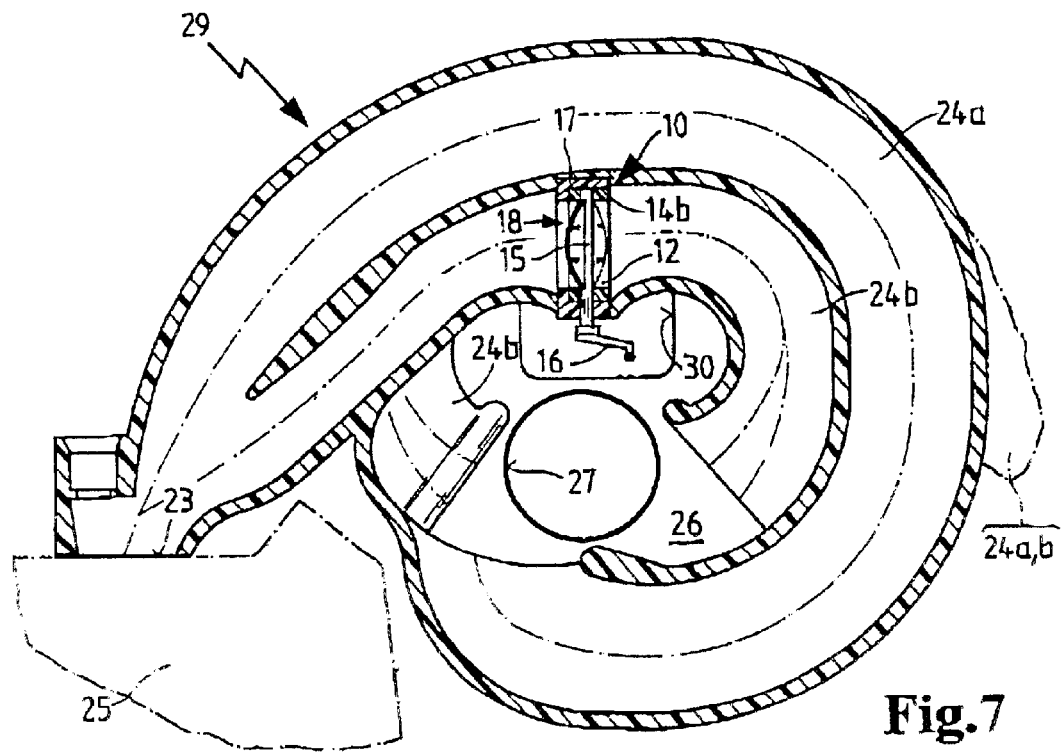
FIG. 7 shows the installation of a switching assembly, according to the design represented in FIG. 4, inside an intake manifold.

FIG. 7 also shows an intake manifold 29 for an internal combustion engine having cylinders in a V-shaped configuration. The intake manifold has intake lines 24a, b of different lengths. A so-called power circuit in the intake manifold may be realized, whereby the short intake lines 24b are opened at higher rotational speeds. Switching assembly 10 having a design corresponding to FIG. 4 is employed for this purpose.

The switching assembly is inserted into the intake manifold through the indicated assembly opening 30 and is positioned in intake lines 24b. The intake lines are alternately arranged for both cylinder banks of the V-shaped internal combustion engine, according to the intake manifold in FIG. 6. The individual switch valves 18 may be controlled via cranks 16. The actuating device, which also may be installed through assembly opening 30, as well as drive 21, situated on the other side of assembly opening 30, are not shown.

Switching assemblies 10 are pre-assembled for installation on the intake manifolds according to FIGS. 6 and 7. Final installation on the intake manifold may also be achieved by a simple manual step, thereby keeping the particularly sensitive costs of final installation low. In FIG. 7, "pre-assembly" means that the assembly injection-molded switch valve modules comprising valves 18 and frame 14b must be inserted into support component 17.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. An intake device for intake air of an internal combustion engine, said intake device comprising:

an intake manifold including intake lines of different lengths, wherein the intake lines lead to outlets of a cylinder head of the engine;

a switching assembly for closing at least a portion of said intake lines, the switch assembly being insertable into the intake manifold through an opening of the intake manifold, the switching assembly comprising, a plurality of closure elements arranged in passages formed by frames for the closure elements, said closure elements being produced by molding in mold cavities defined at least partially by partial surfaces of the respective frames, and a support member for accommodating a plurality of said frames, each frame having a passage for the intake air, the frames being adjacently arranged in the support member, and the passages corresponding to the intake lines, wherein each closure element includes a bearing shaft which is formed in one piece therewith and which defines an individual rotational axis for the respective closure element; and an actuator for actuating the closure elements of the switching assembly using cranks.

2. The intake device according to claim 1, wherein the partial surfaces of the frame which define the mold cavities for the closure elements are partial surfaces of the passages.

3. The intake device according to claim 1, wherein the closure elements comprise switch valves.

4. The intake device according to claim 1, wherein the closure elements comprise rotary valves.

5. The intake device according claim 1, wherein the bearing shafts of the closure elements are disposed at an angle of essentially 90° relative to an imaginary axis extending parallel to the passages.

* * * * *